United States Patent
Karino

(10) Patent No.: US 6,252,956 B1
(45) Date of Patent: *Jun. 26, 2001

(54) SWITCHING SYSTEM DATA INHERITANCE METHOD AND SYSTEM

(75) Inventor: Toshiyuki Karino, Tokyo (JP)

(73) Assignee: NEC Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/601,241

(22) Filed: Feb. 14, 1996

(30) Foreign Application Priority Data

Feb. 17, 1995 (JP) .................................... 7-029164

(51) Int. Cl.$^7$ ............................. H04M 1/64; H04M 3/00; G06F 17/30
(52) U.S. Cl. .................... 379/279; 379/83; 379/88.25; 379/242; 379/284; 707/100; 707/101; 707/200
(58) Field of Search ................. 379/67, 88, 89, 379/201, 15, 115, 230, 242, 243, 279–280, 284, 34, 67.1, 76, 83, 88.08, 88.09, 88.25, 88.27, 88.28, 100.13, 137, 207, 281, 288; 707/101–102, 200, 203; 709/203, 223

(56) References Cited

U.S. PATENT DOCUMENTS

| | | | |
|---|---|---|---|
| 4,894,828 | * 1/1990 | Novy et al. ........................... | 371/11.3 |
| 5,133,068 | * 7/1992 | Crus et al. ........................... | 395/600 |
| 5,168,444 | * 12/1992 | Cukor et al. ........................ | 364/401 |
| 5,241,580 | * 8/1993 | Babson, III ........................... | 379/15 |
| 5,272,749 | * 12/1993 | Masek ................................... | 379/211 |
| 5,341,498 | * 8/1994 | Connor et al. ....................... | 395/600 |
| 5,430,873 | * 7/1995 | Abe et al. ............................. | 395/650 |
| 5,491,742 | * 2/1996 | Harper et al. ....................... | 379/201 |
| 5,548,749 | * 8/1996 | Kroenke et al. ..................... | 395/600 |
| 5,604,796 | * 2/1997 | Yamazaki ............................ | 379/215 |
| 5,611,035 | * 3/1997 | Hall ..................................... | 395/140 |
| 5,623,540 | * 4/1997 | Morrison et al. ................... | 379/115 |

FOREIGN PATENT DOCUMENTS 1-292992  11/1989 (JP) .
3-283894  12/1991 (JP) .

* cited by examiner

Primary Examiner—Allan Hoosain
(74) Attorney, Agent, or Firm—Ostrolenk, Faber, Gerb & Soffen, LLP

(57) ABSTRACT

In a switching system data inheritance method of controlling hardware on the basis of a first database storing various management data such as subscriber information to inherit switching system data for various types of call connection processing, change information indicating a change in structure from the first database to a second database which inherits data from the first database is created. Data constituting the first database is converted into new data having a new structure and constituting the second database on the basis of the created change information to store the converted data in the second database. A switching system data inheritance system is also disclosed.

9 Claims, 4 Drawing Sheets

FIG.2

| TABLE TYPE | TABLE NUMBER | | | | | | | COMPONENT | |
|---|---|---|---|---|---|---|---|---|---|
| | TABLE NAME | | | | | | | TYP 2 | LV 1 |
| | | ATTRIBUTE INFORMATION | | | | ACCOMMODATION INFORMATION | | | |
| | FIELD NAME | TYPE | LENGTH RANGE | | VALUE RANGE | | MINOR INFORMATION 1 | MINOR INFORMATION 2 | |
| | | | MAXIMUM | MINIMUM | MAXIMUM | MINIMUM | | | |
| | NAME 1 | CHAR | 8 | 1 | | | | | |
| | BSCA | UCHAR | 4 | 1 | 15 | 1 | UNUSE = 8, 10 | | |
| | NAME 2 | CHAR | 16 | 0 | --- | | | | |
| | --- | | | | | | | | |

21: {TABLE TYPE, TABLE NUMBER, TABLE NAME}
22: {field rows}
22a: (length range bracket)

| | TABLE NUMBER | ATTRIBUTE INFORMATION | ACCOMMODATION INFORMATION | | COMPONENT | |
|---|---|---|---|---|---|---|
| TABLE TYPE | TABLE NAME | | | | TYP 3 | LV 4 |
| ADDED CONSTITUENT FACTOR | | | | | | |
| IDX 2 | SKP 1 | | | | | |
| FIELD NAME | TYPE | LENGTH RANGE | | VALUE RANGE | | MINOR INFORMATION 1 | MINOR INFORMATION 2 |
| | | MAXIMUM | MINIMUM | MAXIMUM | MINIMUM | | |
| NAME 1 | CHAR | 10 | 1 | | | | |
| BSCA | UCHAR | 6 | 0 | 33 | 1 | UNUSE = 8, 22 | CHG = 12-22 |
| NAME 2 | CHAR | 4 | 4 | | | | |
| ---- | | | | ---- | | | |

| TABLE TYPE | TABLE NUMBER | | | ADDED CONSTITUENT FACTOR |
|---|---|---|---|---|
| | TABLE NAME | COMPONENT | TYP 2-3 | LY 1-4 | |
| NAME 1 | LMAX 8-10 | LMIN 1-0 | VMAX 15-33 | UNUSE 8, 10-8, 22 |
| BSCA | LMAX 4-6 | | | |
| MN 2 | CHG 12-28 | | | |
| NAME 2 | LMIN 1-4 | CHG =LMIN | | ADD AAAA LMIN 1-4 |

41 = TABLE TYPE column; 42 = remaining columns; 42a = TABLE NAME

SWITCHING SYSTEM DATA INHERITANCE METHOD AND SYSTEM

BACKGROUND OF THE INVENTION

The present invention relates to a switching system data inheritance method and system and, more particularly, to a data inheritance method and system which are used to make a database inherit subscriber information and the like used in a switching system from a database when the database have different structures.

In general, various management data such as subscriber information used for call connection processing in a switching system are stored in a database to be managed as a software file (operation file), together with software programs for controlling various types of hardware constituting the switching system. When the database structure needs to be changed to, for example, provide the subscribers with a new service, inheritance of data from an old database to a new database is required as the software file is updated.

Various methods have been proposed as such switching system data inheritance methods. For example, Japanese Patent Laid-Open No. 1-292992 discloses a method of storing all subscriber information transferred from a database via common channel equipment in a database having a new structure. Japanese Patent Laid-Open No. 3-283894 discloses a method in which information indicating a specific type of conversion processing required for old data is registered in a table, and batch processing is performed.

According to the former method as a conventional switching system data inheritance method, information transferred via common channel equipment is inherited. For this reason, a separate conversion program or the like must be developed for management information, which is not generally transferred via the common channel equipment, to execute inheritance processing. According to the latter method, since information about conversion processing required for old data is registered in a table, information about conversion processing for each type of data must be registered depending on each database structure.

Limitations and restrictions regarding data types in data inheritance processing and changes in structure demand creation of new conversion programs or changes of programs, resulting in an increase in operation load. In addition, processing errors caused in creation/changes of conversion programs degrade the reliability of a new database.

SUMMARY OF THE INVENTION

It is an object of the present invention to provide a switching system data inheritance method and system which require no conversion programs and prevent degradation in the reliability of a database.

It is another object of the present invention to provide a switching system data inheritance method and system which prevent an increase in operation load.

In order to achieve the above objects, according to the present invention, there is provided a switching system data inheritance method of controlling hardware on the basis of a first database storing various management data such as subscriber information to inherit switching system data for various types of call connection processing, comprising the steps of creating change information indicating a change in structure from the first database to a second database which inherits data from the first database, and storing converted data in the second database by converting data constituting the first database into new data having a new structure and constituting the second database on the basis of the created change information.

BRIEF DESCRIPTION OF THE DRAWINGS

FIG. 2 is a view for explaining an old database schema in FIG. 1;

FIG. 3 is a view for explaining a new database schema in FIG. 1; and

FIG. 4 is a view for explaining an example of change schema information created by a schema change creating section in FIG. 1.

DESCRIPTION OF THE PREFERRED EMBODIMENT

Figure 1:
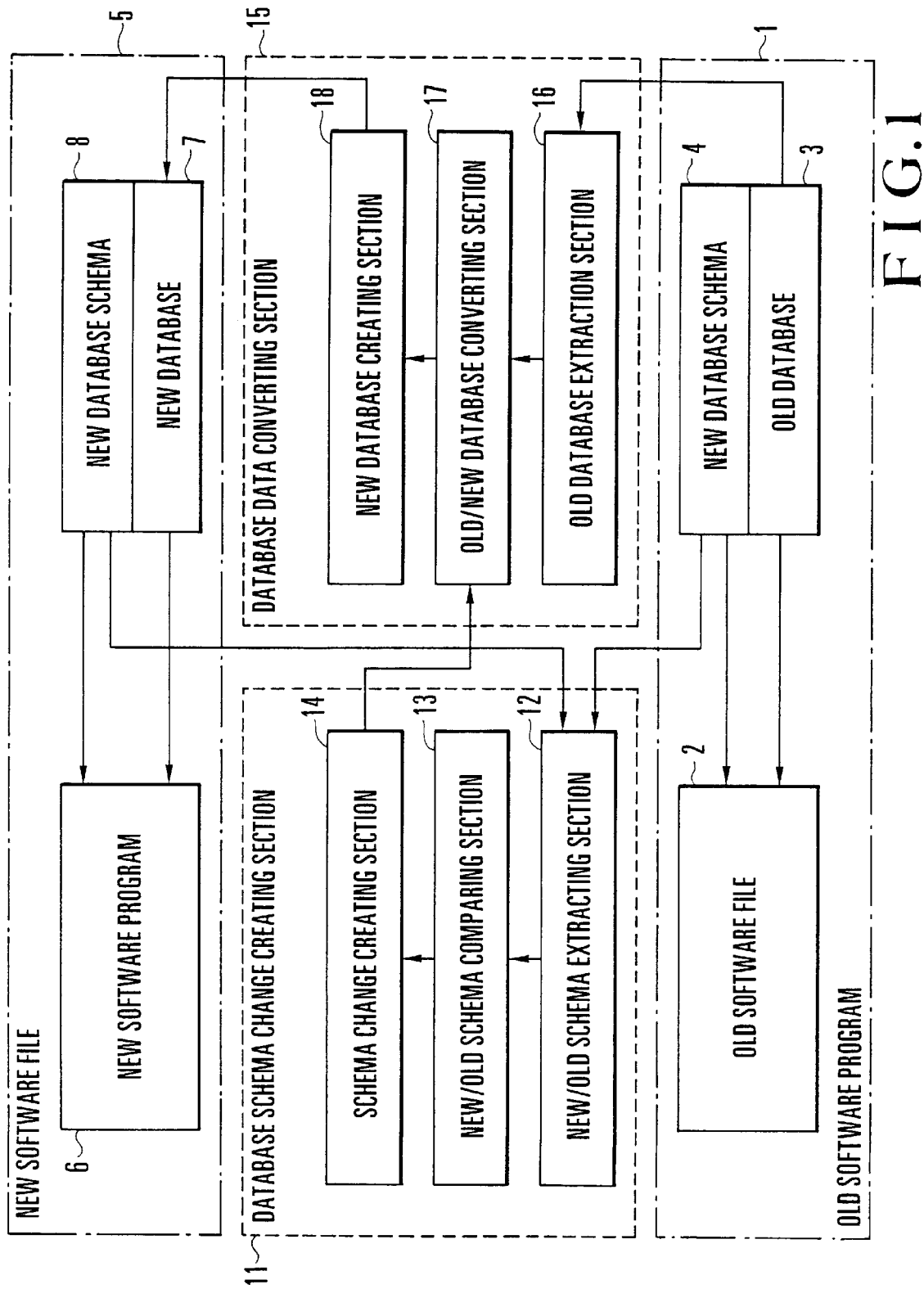
FIG. 1 is a block diagram showing a switching system data inheritance system according to an embodiment of the present invention.

The present invention will be described next with reference to the accompanying drawings.

FIG. 1 shows a switching system data inheritance system according to an embodiment of the present invention. Referring to FIG. 1, reference numeral 1 denotes an old software file constituted by a old software program 2 for controlling various types of hardware in a switching system, an old database 3 (first database) consisting of various management data used for processing, and an old database schema 4 indicating the database structure of the old database 3.

Reference numeral 5 denotes a new software file constituted by a new software program 6 for controlling various types of hardware in the switching system, a new database 7 (second database) consisting of various management data used for processing, and a new database schema 8 indicating the database structure of the new database 7.

Reference numeral 11 denotes a database schema change creating section (database structure change creating section) comprising a new/old schema extracting section 12 for extracting pieces of new and old schema information from the new database schema 8 and the old database schema 4, a new/old schema comparing section 13 for comparing the extracted pieces of new and old schema information with each other, and a schema change creating section 14 for creating new/old change schema information on the basis of this comparison result.

Reference numeral 15 denotes a database data converting section comprising an old database extracting section 16 for extracting old database information from the old database 3, an old/new database converting section 17 for converting the old database into a new database on the basis of change schema information created by the database schema change creating section 11, and a new database creating section 18 for creating a new database on the basis of the conversion result.

Data inheritance processing from the old database 3 to the new database 7 will be described, as an operation of the present invention, with reference to FIG. 1. First of all, the new/old schema extracting section 12 of the database schema change creating section 11 extracts pieces of predetermined new and old schema information from the old database schema 4 of the old software file 1 and the new database schema 8 of the new software file 5.

FIGS. 2 and 3 respectively show examples of the old database schema 4 and the new database schema 8 used in practice. The pieces of schema information of the old database schema 4 and the new database schema 8 are set, as pieces of information describing the respective database structures in detail, in units of tables constituting the old database 3 and the new database 7. Reference numerals 21 and 31 denote pieces of management information; 22 and 32, attribute values indicating field attributes constituting the tables; and 33, a constituent factor added in the new database 7.

The pieces of schema information of the old database schema 4 and the new database schema 8 are input to the new/old schema comparing section 13 to be compared with each other. In this case, the pieces of schema information associated with the same table are compared with each other, and the attribute values of the same field are compared with each other to extract a change in each attribute value. In addition, fields and attributes added/deleted between the old database schema 4 and the new database schema 8 are extracted as comparison results.

These comparison results are input to the schema change creating section 14. In this case, pieces of change schema information between the old database schema 4 and the new database schema 8, like those shown in FIG. 4, are created.

FIG. 4 shows an example of change schema information. Reference numeral 41 denotes management information indicating a corresponding table and the like; and 42, change information. For example, "8" as an attribute "length range/ maximum" in the old database schema 4 as indicated by reference numeral 22a in FIG. 2, is changed to "10" in the new database schema 8 as indicated by reference numeral 32a in FIG. 3. With regards to this change, "UMAX8–10" denoted by reference numeral 42a as the change information 42 of "NAME1" is described in the change schema information in FIG. 4.

Pieces of change schema information indicating changes between the old database schema 4 and the new database schema 8, which are created by the schema change creating section 14, are input to the old/new database converting section 17 of the database data converting section 15. In this case, each data of the old database 3 which is extracted by the old database extracting section 16 is converted on the basis of change schema information. For example, the data length of the field of the above field name "NAME1" is changed from "8" to "10", and addition/deletion of fields is performed.

These converted data are input to the new database creating section 18 and are reconstructed as a database to be stored in the new database 7 of the new software file 5. With this operation, the new software program 6 controls various types of hardware of the switching system on the basis of the new database schema 8 and the constructed new database 7.

In this manner, the database schema change creating section 11 creates change schema information from the old database schema 4 and the new database schema 8, and the old database 3 is converted by the database data converting section 15 on the basis of the change schema information, thereby allowing the new database 7 to inherit the data. Any conversion programs based on database structures need not be created, and hence the operation load in data inheritance can be reduced. In addition, this system is free from data conversion errors caused by bugs accompanying creation/ changes of programs as in a conventional system, and hence the reliability of a database can be maintained.

As has been described above, according to the present invention, this system includes a database structure change creating means for creating change information indicating a change in structure from the first database to the second database, and a database data converting means for converting each data constituting the first database into new data based on the second database on the basis of predetermined change information. With this arrangement, when the second database is to inherit each data from the first database, the database data converting means creates new data on the basis of change information created by the database structure change creating means, and the created data is stored in the second database. With this processing, any conversion programs depending on a database structure need not be created, and hence the operation load in data inheritance can be reduced. In addition, this system is free from data conversion errors caused by bugs accompanying creation/ changes of programs as in a conventional system, and hence the reliability of a database can be maintained.

Furthermore, the database structure change creating means compares pieces of database schema information indicating the structures of the first and second databases to create change information on the basis of the comparison result. With this processing, any information indicating a difference between database structures need not be input, and accurate change information can be easily created.

What is claimed is:

1. A switching system data inheritance method of controlling hardware on the basis of a first database storing various management data such as subscriber information to inherit switching system data for various types of call connection processing and having a first database schema for indicating a database structure of said first data base, comprising the steps of:

creating change schema information indicating a change in schema between said first database schema and a second database schema for indicating a database structure of a second database which inherits data from said first database, said schema including attribute values indicating the required conditions of a field of said first and second databases and said step of creating change schema information including comparing the attribute values of said first and second databases, and indicating changes in the attribute values of a field for each field corresponding to the fields or the first and second databases;

storing converted data in said second database by converting, using said created schema change information, data constituting said first database into new converted data having a new structure and constituting said second database on the basis of the created schema change information, said new converted data in said second database representing only the same information as represented by said data in said first database; and after storing, the converted data in said second database, performing call connection processing on the basis of the second database only.

2. A switching system data inheritance method according to claim 1, wherein the step of creating the change information comprises:

extracting the attribute values of said first and second databases;

comparing the extracted attribute values of said first and second databases with each other; and creating change information on the basis of the attribute value comparison result.

3. A switching system data inheritance method according to claim 1, wherein the step of storing converted data in said second database comprises:

extracting information from said first database;

converting the information extracted from said first database into information indicating the structure of said second database on the basis of said change in attribute values; and storing the converted information indicating the structure of said second database in said second database.

4. A switching system data inheritance method according to claim 1, wherein the attribute values for each field indicate at least the type of data, the maximum value and the minimum value of the data length, and the maximum value and the minimum value of the data value.

5. A switching system data inheritance system comprising:

a first database storing various management data such as subscriber information, said first database being used by a switching system to control hardware so as to perform various types of call connection processing;

a second database which inherits all the data from said first database;

a first database schema for indicating a database structure of said first database;

a second database schema for indicating a database structure of said second database; said schema including attribute values indicating the required conditions of a field of said first and second databases and said step of creating change schema information including comparing the attribute values of said first and second databases, and indicating changes in the attribute values of a field for each field corresponding to the fields or the first and second databases;

database structure change creating means for creating change schema information indicating a change in schema between said first database schema and said second database schema; and database data converting means for converting, using said change schema information from said database schema change creating means, data constituting said first database into new data corresponding to a structure of said second database, said data in said second database representing only the same information as said data in said first database.

6. A switching system data inheritance system according to claim 5, wherein said database structure change creating means comprises:

schema information extracting means for extracting attribute values of said first and second databases;

schema information comparing means for comparing the attribute values of said first and second databases extracted by said schema information extracting means; and schema change creating means for creating change information on the basis of the comparison result obtained by said schema information comparing means.

7. A switching system data inheritance system according to claim 5, wherein said database data converting means comprises:

database information extracting means for extracting information from said first database;

database information converting means for converting the information extracted from said first database by said database extracting means into indicating structure of said second database on the basis of said change in attribute values from said database structure change creating means; and database creating means for creating said second database by storing the information indicating the structure of said second database, which is supplied from said database information converting means, in said second database.

8. A switching system data inheritance system according to claim 5, further comprising:

a first software program for controlling hardware of said switching system in accordance with said database structure of said first database; and a second software program for controlling the hardware of said switching system in accordance with said database structure of said second database.

9. A switching system data inheritance system according to claim 5, wherein the attribute values for each field indicate at least the type of data, the maximum value and the minimum value of the data length, and the maximum value and the minimum value of the data value.

* * * * *